United States Patent
Fukunaga et al.

(10) Patent No.: US 10,916,760 B2
(45) Date of Patent: Feb. 9, 2021

(54) SECONDARY BATTERY AND METHOD OF MANUFACTURING SAME

(71) Applicant: SANYO Electric Co., Ltd., Daito (JP)

(72) Inventors: Masao Fukunaga, Hyogo (JP); Ryoichi Wakimoto, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 113 days.

(21) Appl. No.: 16/312,005

(22) PCT Filed: Jun. 28, 2017

(86) PCT No.: PCT/JP2017/023719
§ 371 (c)(1),
(2) Date: Dec. 20, 2018

(87) PCT Pub. No.: WO2018/003843
PCT Pub. Date: Jan. 4, 2018

(65) Prior Publication Data
US 2019/0379027 A1    Dec. 12, 2019

(30) Foreign Application Priority Data

Jun. 30, 2016 (JP) .................................. 2016-129622

(51) Int. Cl.
*H01M 2/26* (2006.01)
*H01M 10/058* (2010.01)

(52) U.S. Cl.
CPC ........... *H01M 2/26* (2013.01); *H01M 10/058* (2013.01)

(58) Field of Classification Search
CPC ........................... H01M 10/0525; H01M 2/26
See application file for complete search history.

(56) References Cited

U.S. PATENT DOCUMENTS

2006/0035147 A1* 2/2006 Lam ...................... H01M 4/133
429/218.1
2014/0023898 A1* 1/2014 Minami .............. H01M 4/0435
429/94

(Continued)

FOREIGN PATENT DOCUMENTS

JP 51-51432 U 4/1976
JP 7-226197 A 8/1995

(Continued)

OTHER PUBLICATIONS

International Search Report dated Aug. 29, 2017, issued in counterpart International Application No. PCT/JP2017/023719 (2 pages).

*Primary Examiner* — Olatunji A Godo
(74) *Attorney, Agent, or Firm* — Westerman, Hattori, Daniels & Adrian, LLP (57) ABSTRACT

A method of manufacturing a secondary battery including an electrode body having a positive electrode plate (40) having a positive electrode tab (4c), a negative electrode plate (5) having a negative electrode tab (5c), and a separator, in which the positive electrode tab (4c) is connected to a positive electrode collector in a curved state and the negative electrode tab (5c) is connected to a negative electrode collector in a curved state, and in which, as the positive electrode plate (4), one provided with a cutaway (4e) at a base of the positive electrode tab (4c) in a region where a positive electrode active material mixture layer (4a) is formed on a positive electrode core body is used.

14 Claims, 7 Drawing Sheets

(56) References Cited

U.S. PATENT DOCUMENTS

2017/0012316 A1    1/2017   Ogihara et al.
2017/0110725 A1*   4/2017   Sakamoto ............. H01M 4/136

FOREIGN PATENT DOCUMENTS

| | | |
|---|---|---|
| JP | 2012-14935 A | 1/2012 |
| JP | 2013-73757 A | 4/2013 |
| JP | 2013-187077 A | 9/2013 |
| JP | 2013-196959 A | 9/2013 |
| JP | 2013-206607 A | 10/2013 |
| JP | 2014-93151 A | 5/2014 |
| JP | 2015-72805 A | 4/2015 |
| JP | 2015-159087 A | 9/2015 |
| WO | 2015/111187 A1 | 7/2015 |
| WO | WO 2015/151376 A * | 10/2015 |

* cited by examiner

SECONDARY BATTERY AND METHOD OF MANUFACTURING SAME

TECHNICAL FIELD

The present invention relates to a secondary battery and a method of manufacturing the same.

BACKGROUND ART

Secondary batteries such as alkaline secondary batteries and nonaqueous electrolyte secondary batteries are used in power sources for driving electric vehicles (EV), hybrid electric vehicles (HEV, PHEV), and the like.

In square secondary batteries serving as such secondary batteries, a battery case is formed by a bottomed cylindrical square outer package including an opening and a sealing plate that seals the opening. The battery case accommodates therein an electrode body including positive electrode plates, negative electrode plates, and separators, and an electrolyte. A positive electrode terminal and a negative electrode terminal are installed in the sealing plate. The positive electrode terminal is electrically connected to the positive electrode plates through a positive electrode collector, and the negative electrode terminal is electrically connected to the negative electrode plates through a negative electrode collector.

The positive electrode plates each include a positive electrode core body made of metal and a positive electrode active material mixture layer formed on the surface of the positive electrode core body. A positive electrode core body exposed portion, on which no positive electrode active material mixture layer is formed, is formed in a portion of each positive electrode core body. Furthermore, the positive electrode collector is connected to the positive electrode core body exposed portion. Furthermore, the negative electrode plates each include a negative electrode core body made of metal and a negative electrode active material mixture layer formed on the surface of the negative electrode core body. A negative electrode core body exposed portion, on which no negative electrode active material mixture layer is formed, is formed in a portion of each negative electrode core body. Furthermore, the negative electrode collector is connected to the negative electrode core body exposed portion.

For example, in PTL 1 described below, a square secondary battery in which a positive electrode tab and a negative electrode tab are disposed at an end portion of the electrode body on a sealing plate side is proposed.

CITATION LIST

Patent Literature

PTL 1: Japanese Published Unexamined Patent Application No. 2015-159087

SUMMARY OF INVENTION

Technical Problem

An object of the claimed invention is to provide a secondary battery that has a high volume energy density and that has a higher reliability.

Solution to Problem

A method of manufacturing a square secondary battery, which is an aspect of the present invention and which includes an electrode body having a positive electrode plate having a positive electrode tab, a negative electrode plate having a negative electrode tab, and a separator disposed between the positive electrode plate and the negative electrode plate, a positive electrode collector electrically connected to the positive electrode plate, a negative electrode collector electrically connected to the negative electrode plate, an outer package that includes an opening and that houses the electrode body, and a sealing plate that seals the opening, in which the positive electrode tab and the negative electrode tab are disposed on a sealing plate side of the electrode body, the positive electrode plate includes a positive electrode core body and a positive electrode active material mixture layer formed on the positive electrode core body, the positive electrode plate having a body portion in which the positive electrode active material mixture layer is formed on the positive electrode core body, the positive electrode tab protrudes from an end portion of the body portion, a cutaway is, in the body portion of the positive electrode plate, provide at a base of the positive electrode tab, and the positive electrode tab and the negative electrode tab are in a curved state, the method of manufacturing a secondary battery, includes a cutting away step of providing, in the positive electrode core body, the cutaway at a portion in which the positive electrode active material mixture layer is formed, an electrode body fabricating step of fabricating the electrode body using the positive electrode plate and the negative electrode plate, and a connecting step of connecting the positive electrode tab to the positive electrode collector.

In the configuration described above, the positive electrode tab and the negative electrode tab are disposed on the sealing plate side of the electrode body, and the positive electrode tab and the negative electrode tab are connected to the positive electrode collector and the negative electrode collector in a curved state. With the above, the secondary battery can be one with a higher volume energy density. Furthermore, by having the positive electrode tab and the negative electrode tab be in a curved state, the positive electrode tab or the negative electrode tab can be prevented from becoming damaged or broken even when there is a strong impact or a vibration applied to the secondary battery.

In the above, when the positive electrode tab is in a curved state, distortion in the positive electrode plate in a portion near the base of the positive electrode tab or a creation of a gap between the positive electrode plate in the portion near the base of the positive electrode tab and the separator may occur. In such a case, the positive electrode active material mixture layer may become damaged or charge and discharge reaction may not be able to be performed in a smooth manner. In the configuration described above, since the cutaway is, in the positive electrode plate, provided at the base portion of the positive electrode tab, even when the positive electrode tab is in a curved state, distortion in the positive electrode plate in the portion near the base of the positive electrode tab or the creation of a gap between the positive electrode plate in the portion near the base of the positive electrode tab and the separator can be prevented. Accordingly, a secondary battery having a higher reliability can be obtained with the configuration described above.

A square battery that is an aspect of the present invention includes an electrode body having a positive electrode plate having a positive electrode tab, a negative electrode plate having a negative electrode tab, and a separator disposed between the positive electrode plate and the negative electrode plate, a positive electrode collector electrically connected to the positive electrode plate, a negative electrode collector electrically connected to the negative electrode plate, an outer package that includes an opening and that houses the electrode body, and a sealing plate that seals the opening, in which the positive electrode tab and the negative electrode tab are disposed on a sealing plate side of the electrode body, the positive electrode plate includes a positive electrode core body and a positive electrode active material mixture layer formed on the positive electrode core body, the positive electrode plate having a body portion in which the positive electrode active material mixture layer is formed on the positive electrode core body, the positive electrode tab protrudes from an end portion of the body portion, a cutaway is, in the body portion of the positive electrode plate, provide at a base of the positive electrode tab, and the positive electrode tab and the negative electrode tab are in a curved state.

In the configuration described above, the positive electrode tab and the negative electrode tab are disposed on the sealing plate side of the electrode body, and the positive electrode tab and the negative electrode tab are connected to the positive electrode collector and the negative electrode collector in a curved state. With the above, the secondary battery can be one with a higher volume energy density. Furthermore, by having the positive electrode tab and the negative electrode tab be in a curved state, the positive electrode lab or the negative electrode tab can be prevented from becoming damaged or broken even when there is a strong impact or a vibration applied to the secondary battery.

In the above, when the positive electrode tab is in a curved state, distortion in the positive electrode plate in a portion near the base of the positive electrode tab or a creation of a gap between the positive electrode plate in the portion near the base of the positive electrode tab and the separator may occur. In such a case, the positive electrode active material mixture layer may become damaged or charge and discharge reaction may not be able to be performed in a smooth manner. In the configuration described above, since the cutaway is, in the positive electrode plate, provided at the base portion of the positive electrode tab, even when the positive electrode tab is in a curved state, distortion in the positive electrode plate in the portion near the base of the positive electrode tab or the creation of a gap between the positive electrode plate in the portion near the base of the positive electrode tab and the separator can be prevented. Accordingly, a secondary battery having a higher reliability can be obtained with the configuration described above.

Advantageous Effects of Invention

According to the present invention, the secondary battery becomes one with a high volume energy density and with a higher reliability.

DESCRIPTION OF EMBODIMENTS

A configuration of a square secondary battery 20 according to an exemplary embodiment will be described below. Note that the present invention is not limited to the following exemplary embodiment.

As illustrated in FIGS. 1 to 6, the square secondary battery 20 includes a square outer package 1 that has an opening, and a sealing plate 2 that seals the opening. The square outer package 1 and the sealing plate 2 are desirably made of metal and, for example, may be made of aluminum or an aluminum alloy. The square outer package 1 includes a bottom 1a, a pair of large-area side walls 1b, and a pair of small-area side walls 1c. The square outer package 1 is a bottomed and cylindrical outer package having a rectangular shape and includes the opening at a position opposing the bottom 1a. A stacked electrode body 3 in which a plurality of positive electrode plates and a plurality of negative electrode plates are stacked with separators interposed therebetween are accommodated in the square outer package 1 together with an electrolyte.

Positive electrode plates 4 each include a positive electrode core body made of metal and a positive electrode active material mixture layer 4a that includes a positive electrode active material formed on the positive electrode core body. Each positive electrode plate 4 includes, at one of its ends, a positive electrode core body exposed portion 4b in which the positive electrode core body is exposed. Note that, desirably, an aluminum foil or an aluminum alloy foil is used for the positive electrode core body. Negative electrode plates 5 each include a negative electrode core body made of metal and a negative electrode active material mixture layer 5a that includes a negative electrode active material formed on the negative electrode core body. Each negative electrode plate 5 includes, at one of its ends, a negative electrode core body exposed portion 5b in which the negative electrode core body is exposed. Note that, desirably, a copper foil or a copper alloy foil is used for the negative electrode core body. In the square secondary battery 20, each positive electrode core body exposed portion 4b constitutes a positive electrode tab 4c, and each negative electrode core body exposed portion 5b constitutes a negative electrode tab 5c. The positive electrode tab 4c is provided so as to protrude from an end portion of a body portion 4f that has the positive electrode active material mixture layer 4a formed on the positive electrode core body. The negative electrode tab 5c is provided so as to protrude from an end portion of a body portion 5f that has the negative electrode active material mixture layer 5a formed on the negative electrode core body.

Figure 2:
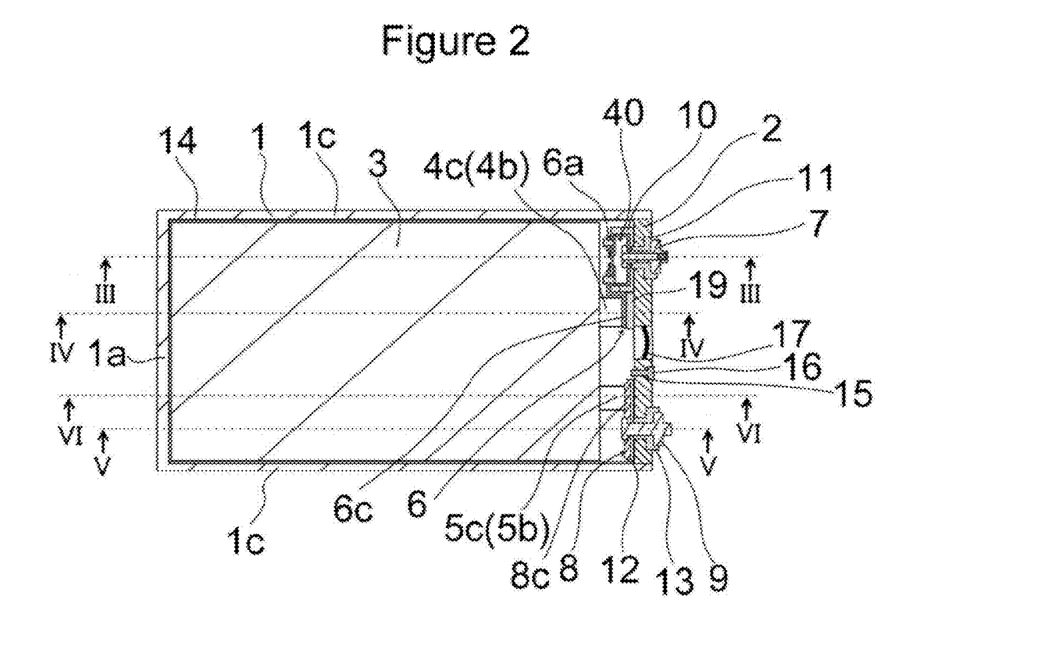
FIG. 2 is a cross-sectional view taken along line II-II in FIG. 1.
Figure 3:
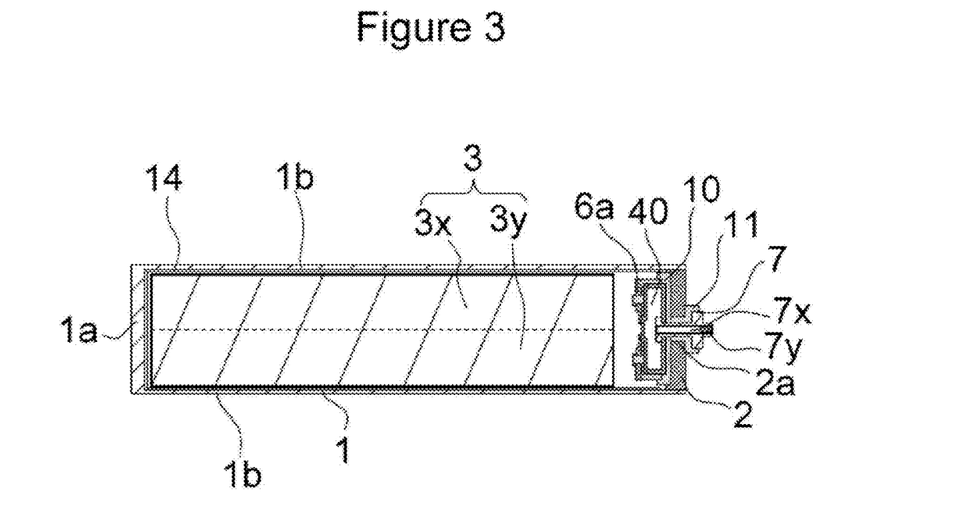
FIG. 3 is a cross-sectional view taken along line III-III in FIG. 2.
Figure 4:
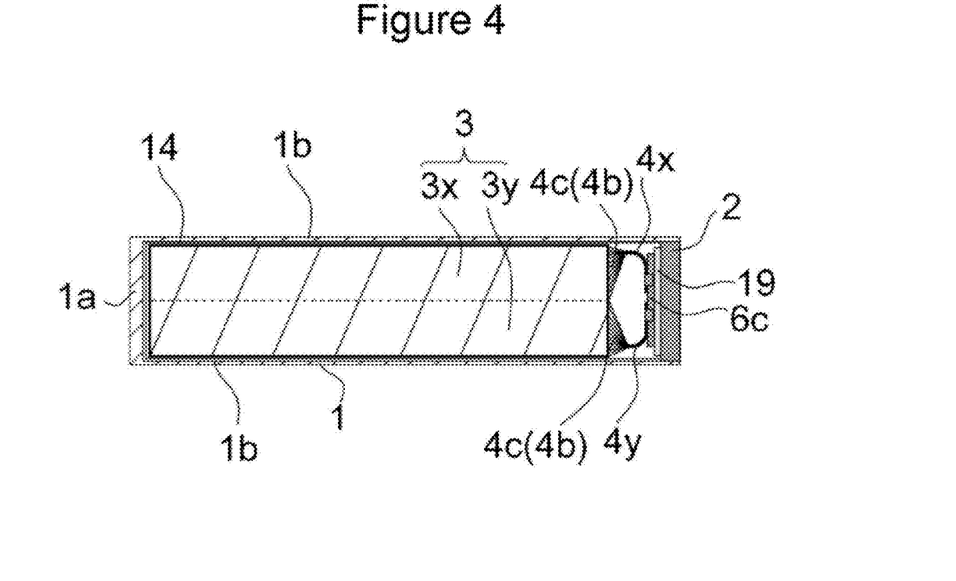
FIG. 4 is a cross-sectional view taken along line IV-IV in FIG. 2.
Figure 5:
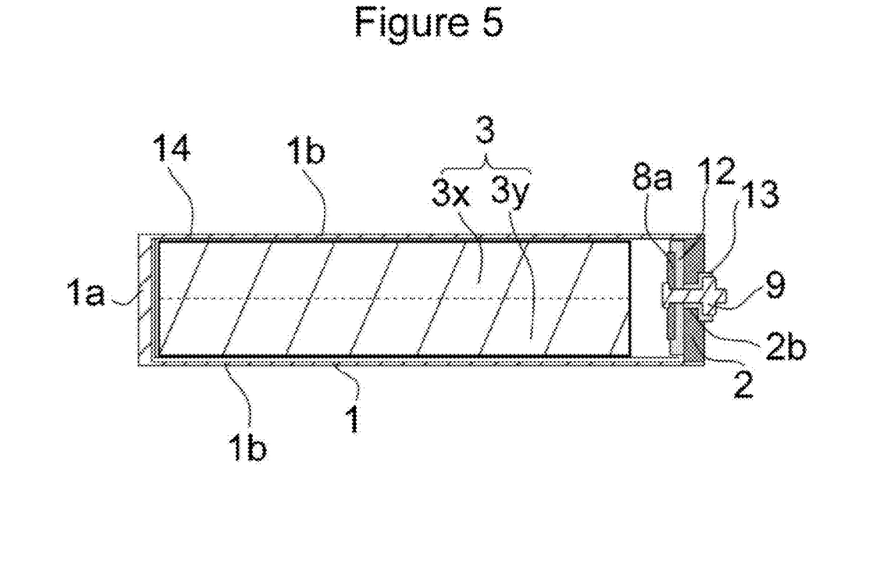
FIG. 5 is a cross-sectional view taken along line V-V in FIG. 2.
Figure 6:
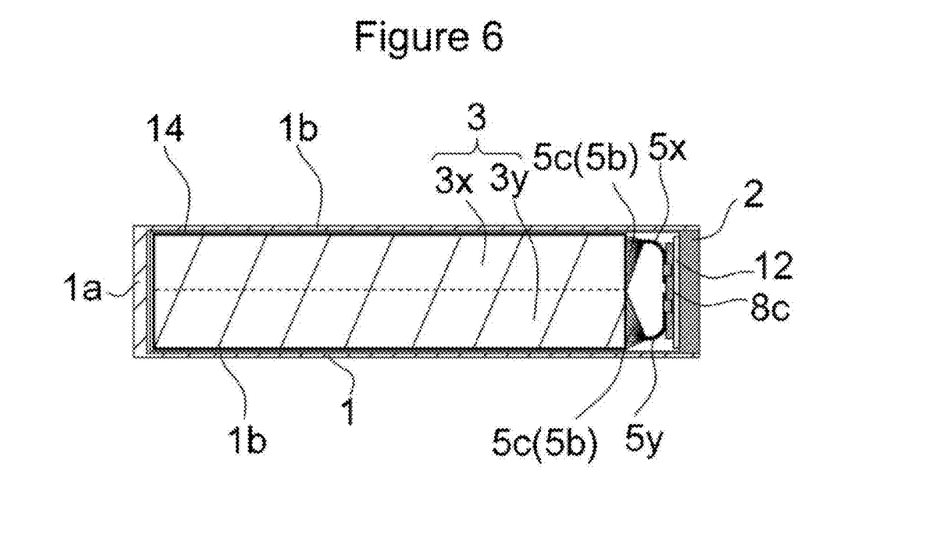
FIG. 6 is a cross-sectional view taken along line VI-VI in FIG. 2.

At an end portion of the electrode body 3 on the sealing plate 2 aide, positive electrode tabs 4c are disposed in a stacked state to constitute positive electrode tab groups (4x and 4y) and the negative electrode tabs 5c are disposed in a stacked state to constitute negative electrode tab groups (5x and 5y). The stacked positive electrode tabs 4c are connected to a lead portion 6c of a positive electrode collector 6. Furthermore, a positive electrode terminal 7 is electrically connected to the positive electrode collector 6. The stacked negative electrode tabs 5c are connected to a lead portion 8c of a negative electrode collector 8. Furthermore, a negative electrode terminal 9 is electrically connected to the negative electrode collector 8. A pressure-sensitive current breaking mechanism 40 is provided in the conductive path between the positive electrode plates 4 and the positive electrode terminal 7. The current breaking mechanism 40 is activated when the pressure in an battery inner portion becomes equivalent to or higher than a predetermined value, and the current is cut off by cutting off the conductive path between the positive electrode plates 4 and the positive electrode terminal 7. Note that the pressure-sensitive current breaking mechanism 40 may be provided in the conductive path between the negative electrode plates 5 and the negative electrode terminal 9.

The positive electrode terminal 7 is attached to the sealing plate 2 in an electrically insulated state with respect to the sealing plate 2 with an inner side insulating member 10 and an outer side insulating member 11. Furthermore, the negative electrode terminal 9 is attached to the sealing plate 2 in an electrically insulated state with respect to the sealing plate 2 with an inner side insulating member 12 and an outer side insulating member 13. The inner side insulating members 10 and 12 and the outer side insulating members 11 and 13 are desirably made of resin.

A terminal through-hole 7x is provided in the positive electrode terminal 7, and the terminal through-hole 7x is sealed with a terminal plug 7y.

Figure 1:
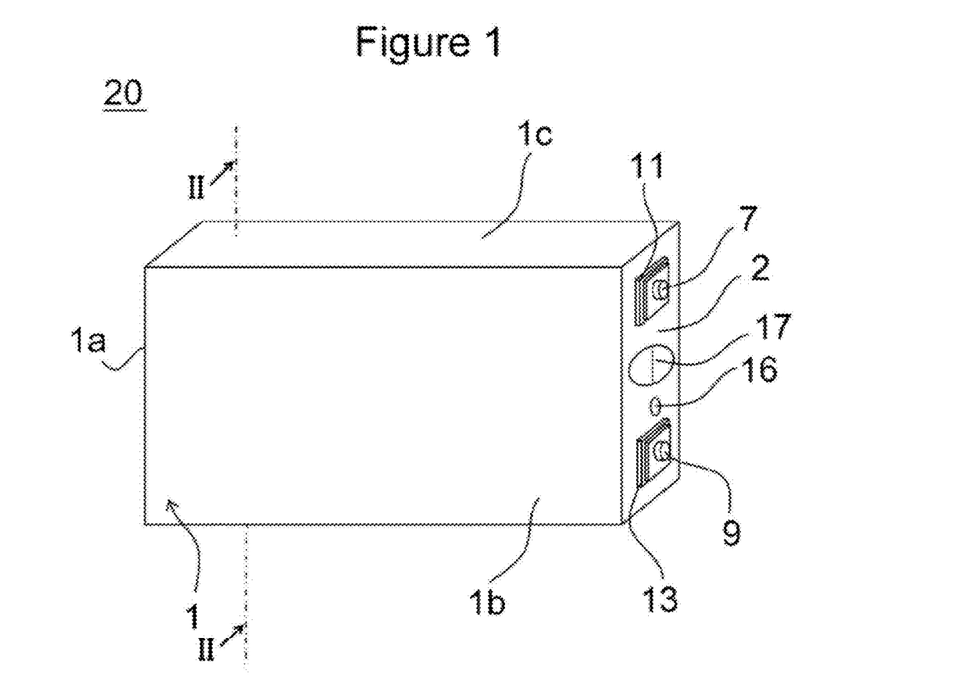
FIG. 1 is a perspective view of a square secondary battery according to an exemplary embodiment.

The electrode body 3 covered by an insulation sheet 14 is accommodated inside the square outer package 1. Desirably, a resin sheet folded in a box shape or a bag-shaped resin sheet is used as the insulation sheet 14. The sealing plate 2 is joined to an opening edge portion of the square outer package 1 by laser welding or the like. The sealing plate 2 includes an electrolyte injection hole 15, and the electrolyte injection hole 15 is sealed with a sealing plug 16 after injection of an electrolyte. A gas discharge valve 17 for discharging gas in the battery inner portion to the battery outer portion is formed in the sealing plate 2. The gas discharge valve 17 is activated when the pressure in the battery inner portion becomes equivalent to or higher than a predetermined value. Note that the pressure at which the gas discharge valve 17 is activated is set higher than the pressure at which the current breaking mechanism 40 is activated.

A method for manufacturing the square secondary battery 20 will be described next.

[Fabrication of Positive Electrode Plate]

A positive electrode slurry containing lithium-nickel-cobalt-manganese composite oxide as a positive electrode active material, polyvinylidene fluoride (PVdF) as a binding agent, a carbon material as a conducting agent, lithium carbonate, and N-methylpyrrolidone (NMP) is fabricated. Note that in mass ratio, the mixed rate of the positive electrode active material, the binding agent, the conducting agent, and lithium carbonate is 87:3:9:1. The positive electrode slurry is coated on both surfaces of a rectangular aluminum foil that is 15 μm thick and that serves as the positive electrode core body. In so doing, the positive electrode core body exposed portion is formed on both sides and at an end portion in the width direction of the long positive electrode core body. Subsequently, by drying the above, the N-methylpyrrolidone in the positive electrode slurry is removed and the positive electrode active material mixture layers are formed on the positive electrode core body. Subsequently, the positive electrode core body exposed portion is cut into a predetermined shape to form the positive electrode tab 4c. Furthermore, cutaways 4e are provided in the positive electrode core body in an area where the positive electrode active material mixture layer is formed and at a base of the positive electrode tab 4c. Subsequently, a compression process is performed so that the positive electrode active material mixture layers are compressed to a predetermined thickness. The positive electrode plate obtained in the above manner is cut into a predetermined shape.

[Fabrication of Negative Electrode Plate]

A negative electrode slurry containing graphite as a negative electrode active material, styrene-butadiene rubber (SBR) as a binding agent, carboxymethyl cellulose (CMC) as a thickener, and water is fabricated. Note that in mass ratio, the mixed rate of the negative electrode active material, the binding agent, and the thickener is 98:1:1. The negative electrode slurry is coated on both surfaces of a rectangular copper foil that is 8 μm thick and that serves as the negative electrode core body. In so doing, the negative electrode core body exposed portion is formed on both sides and at an end portion in the width direction of the long negative electrode core body. Subsequently, by drying the above, the water in the negative electrode slurry is removed and the negative electrode active material mixture layers are formed on the negative electrode core body. Subsequently, a compression process is performed so that the negative electrode active material mixture layers are compressed to a predetermined thickness. The negative electrode plate obtained in the above manner is cut into a predetermined shape.

Figure 7:
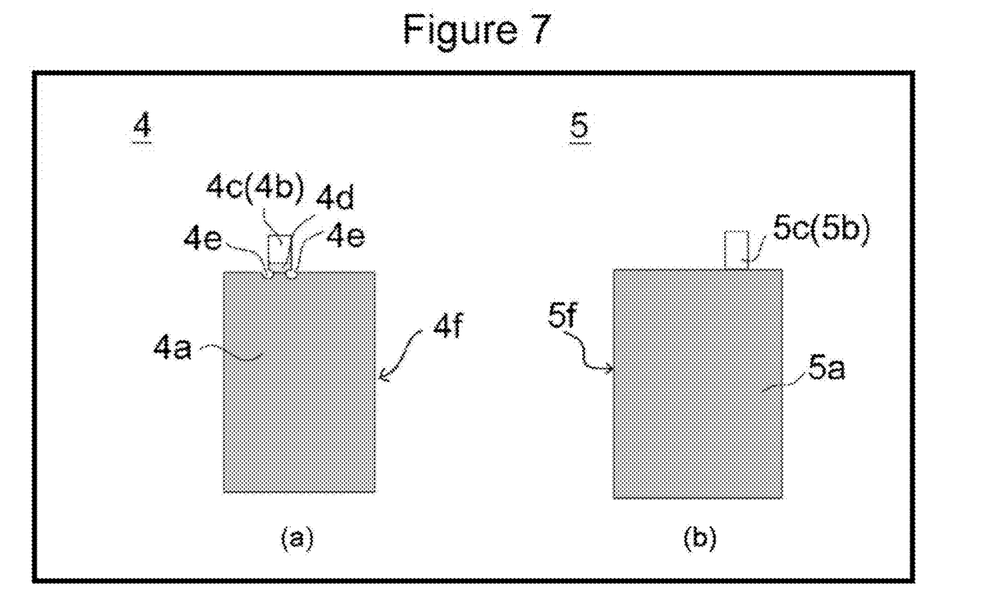
FIG. 7 includes plan views of a positive electrode plate and a negative electrode plate according to the exemplary embodiment.

FIG. 7 illustrates plan views of a positive electrode plate 4 (FIG. 7(a)) and a negative electrode plate 5 (FIG. 7(b)) after cutting. The positive electrode plate 4 includes the body portion 4f having a rectangular shape on which the positive electrode active material layer 4a is formed on both surfaces of the positive electrode core body, and the positive electrode core body exposed portion 4b serving as the positive electrode tab 4c is formed on one side of the positive electrode plate 4. The negative electrode plate 5 includes the body portion 5f having a rectangular shape on which the negative electrode active material layer 5a is formed on both surfaces of the negative electrode core body, and the negative electrode core body exposed portion 5b serving as the negative electrode tab 5c is formed on one side of the negative electrode plate 5. Note that the size of the positive electrode plate 4 is formed slightly smaller than the size of the negative electrode plate 5. An insulating layer or a protective layer 4d that has an electric resistance that is higher than those of the positive electrode core body and the positive electrode active material mixture layer can be provided at the base portion of the positive electrode tab 4c. Note that, the protective layer 4d is not an essential component and do not necessarily have to be provided. Furthermore, the body portions of the positive electrode plates 4 and the negative electrode plates 5 are not limited to any shapes in particular. The shapes of the body portions of the positive electrode plates 4 and the negative electrode plates 5 are, desirably, substantially rectangular, and cutaways or the like may be provided at corner portions thereof, or the corner portions may have rounded shapes. A width of each positive electrode tab 4c and a width of each negative electrode tab 5c are preferably 10 mm or larger and are preferably 50 mm or smaller.

As illustrated in FIG. 7, cutaways 4e are, in the body portion 4f of the positive electrode plate 4, provided at the base portion of the positive electrode tab 4c. The cutaways 4e may be formed when cutting off the positive electrode plate to form the positive electrode tab 4c. Alternatively, the cutaways 4e may be formed separately after the positive electrode tab 4c has been formed.

[Fabrication of Electrode Body Elements]

Figure 8:
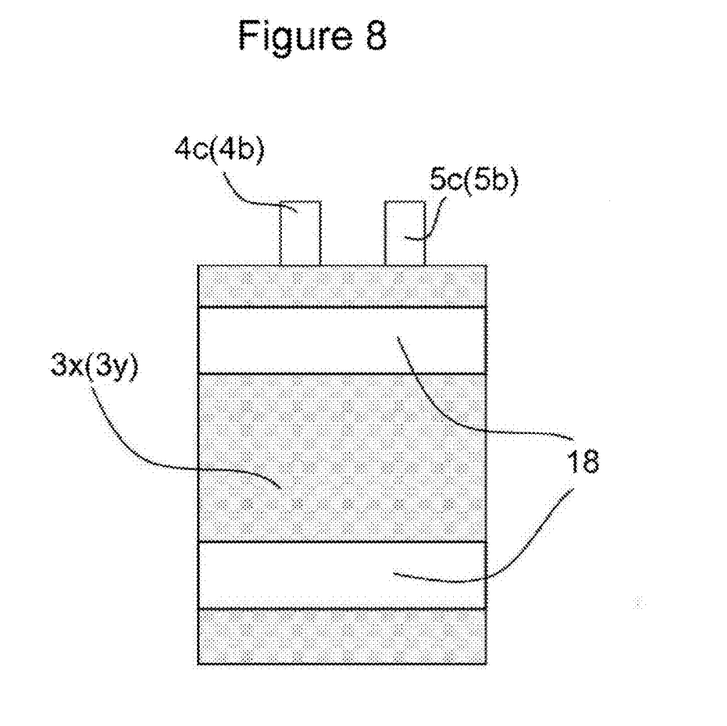
FIG. 8 is a plan view of an electrode body element according to the exemplary embodiment.

Stacked electrode body elements (3x and 3y) are fabricated by fabricating 50 pieces of positive electrode plates 4 and 51 pieces of negative electrode plates 5 with the above methods and by stacking the above on each other with a rectangular polyolefin separator in between. As illustrated in FIG. 8, the stacked electrode body elements (3x and 3y) are fabricated so that, at one end portion, the positive electrode tabs 4c of the positive electrode plates 4 are stacked and the negative electrode tabs 5c of the negative electrode plates 5 are stacked. Separators may be disposed on both outer surfaces of the electrode body elements (3x and 3y) and the electrode plates and the separators may be fixed in a stacked state with tapes 18 or the like. Alternatively, an adhesion layer may be provided on each separator so that the separators and the positive electrode plates 4, and the separators and the negative electrode plates 5 are adhered to each other. Note that the separator in plan view is formed to have a size that is the same as that of the negative electrode plate 5 or that is larger than that of the negative electrode plate 5. Each positive electrode plate 4 may be disposed between two separators and after heat welding the outer peripherals of the separators, each of the positive electrode plates 4 and each of the negative electrode plates 5 may be stacked on each other.

<Attaching Positive Electrode Terminal and Current Breaking Mechanism to Sealing Plate>

Figure 9:
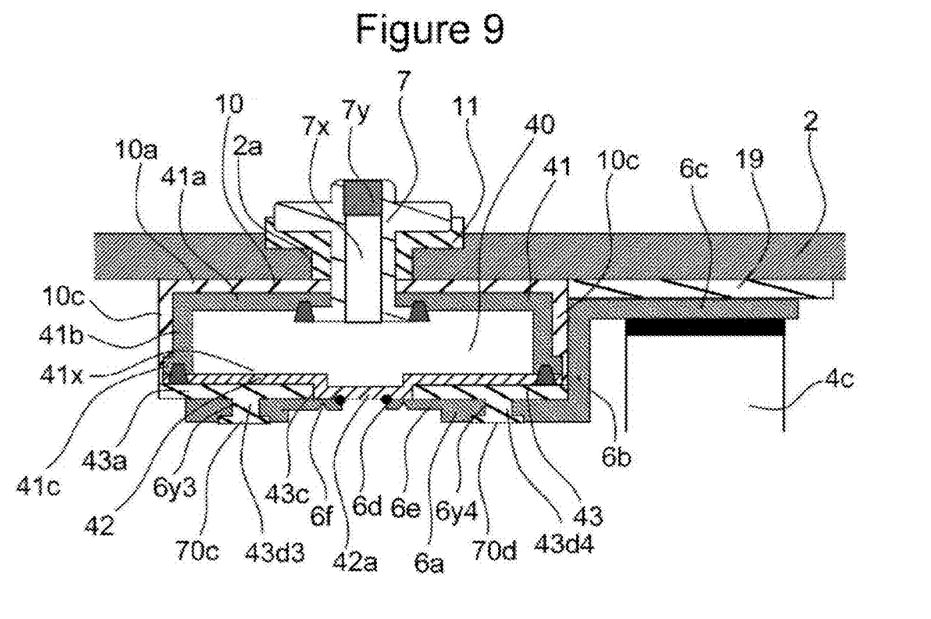
FIG. 9 is a cross-sectional view of a portion in the vicinity of a current breaking mechanism in a longitudinal direction of a sealing plate.
Figure 10:
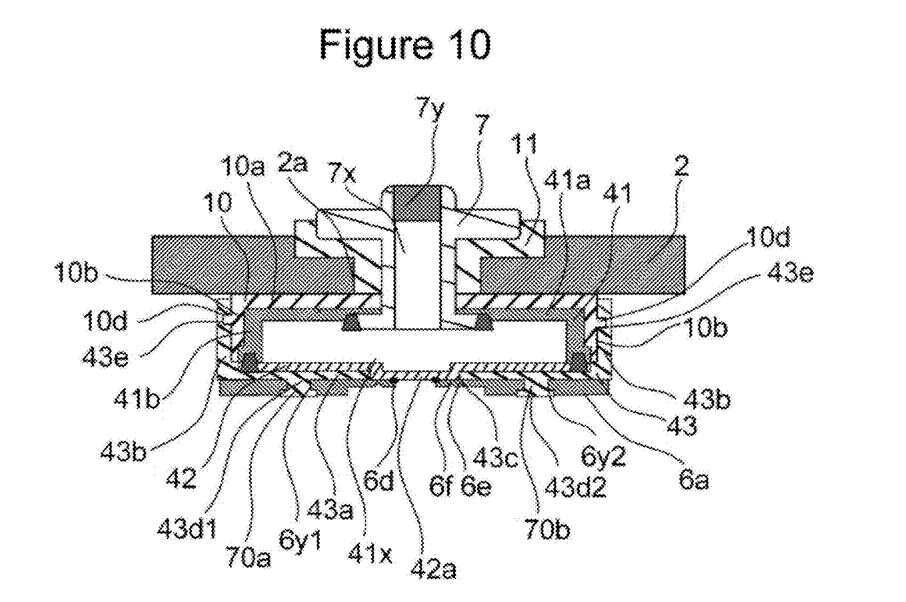
FIG. 10 is a cross-sectional view of a portion in the vicinity of the current breaking mechanism in a short direction of the sealing plate.

FIG. 9 is a cross-sectional view of a vicinity of the current breaking mechanism 40 taken in a longitudinal direction of the sealing plate 2. FIG. 10 is a cross-sectional view of a vicinity of the current breaking mechanism 40 in a short direction of the sealing plate 2.

A through-hole serving as a positive electrode terminal mounting hole 2a is formed in the sealing plate 2. The outer side insulating member 11 is disposed on a battery outer surface side of the positive electrode terminal mounting hole 2a, and the inner side insulating member 10 and a conductive member 41 are disposed on a battery inner surface side. Furthermore, the positive electrode terminal 7 is inserted from the battery outer portion side through the through-holes formed in the outer side insulating member 11, the sealing plate 2, the inner side insulating member 10 and the conductive member 41, and a tip of the positive electrode terminal 7 is riveted on the conductive member 41. Note that the riveted portion of the tip of the positive electrode terminal 7 is, desirably, further welded to the conductive member 41.

Desirably, the conductive member 41 has a cup-shape that includes an opening portion 41x on an electrode body 3 side. The conductive member 41 includes a base portion 41a that is disposed parallel to the sealing plate 2, and a tubular portion 41b that extends from the base portion 41a towards the electrode body 3 side. The tubular portion 41b may have a cylindrical shape or may be a rectangular tubular portion. The conductive member 41 is made of metal and, desirably, is made of aluminum or an aluminum alloy. The positive electrode terminal 7 is connected to the base portion 41a. Note that the positive electrode terminal 7 and the conductive member 41 may be an integral component. In such a case, the positive electrode terminal 7 is inserted into the through-holes of the components from the battery inner portion side and is riveted on the battery outer portion side.

The inner side insulating member 10 includes an insulating member body portion 10a disposed between the sealing plate 2 and the base portion 41a of the conductive member 41, a pair of insulating member first side walls 10b that extend from the two end portions of the insulating member body portion 10a in the short direction of the sealing plate 2 towards the electrode body 3 side, and a pair of insulating member second side walls 10c that extend from the two end portions of the insulating member body portion 10a in the longitudinal direction of the sealing plate 2 towards the electrode body 3 side. A protrusion 10d is formed on an outer surface of each insulating member first side wall 10b.

Subsequently, a deformation plate 42 is disposed so as to close the opening portion 41x of the conductive member 41 on the electrode body 3 side, and an outer peripheral edge of the deformation plate 42 is joined to the conductive member 41 by laser welding or the like. With the above, the opening portion 41x of the conductive member 41 on the electrode body 3 side is sealed in an airtight manner. The deformation plate 42 is made of metal and, desirably, is made of aluminum or an aluminum alloy.

Subsequently, a dielectric plate 43 is disposed on a surface of the deformation place 42 on the electrode body 3 side. The dielectric plate 43 includes a dielectric plate body portion 43a disposed between the deformation plate 42 and a collector body portion 6a of the positive electrode collector 6, and a pair of dielectric plate first side walls 43b that extend from two end portions of the dielectric plate body portion 43a in a short direction of the sealing plate 2 towards the sealing plate 2 side. A dielectric plate through-hole 43c, a first projection 43d1, a second projection 43d2, a third projection 43d3, and a fourth projection 43d4 are formed in the dielectric plate body portion 43a. Furthermore, recesses 43e are formed on inner surfaces of the dielectric place first side walls 43b.

A projection 42a formed in the middle portion of the deformation plate 42 is inserted into the dielectric plate through-hole 43c formed in the dielectric plate body portion 43a. Furthermore, the inner surfaces of the dielectric plate first side walls 43b are disposed so as to face the outer surfaces of the insulating member first side walls 10b. Furthermore, by fitting the protrusions 10d and the recesses 43e to each other, the inner side insulating member 10 and the dielectric plate 43 are connected to each other. Note that the recesses 43e may be through-holes.

Flange portions 41c are provided on the end portions of the conductive member 41 on the electrode body 3 side. Furthermore, hooking and fixing portions that can be hooked to the flange portions 41c of the conductive member 41 are desirably provided on the surface of the dielectric plate body portion 43a on the sealing plate 2 side. With the above, the dielectric plate 43 is fixed to the conductive member 41.

<Positive Electrode Collector>

Figure 11:
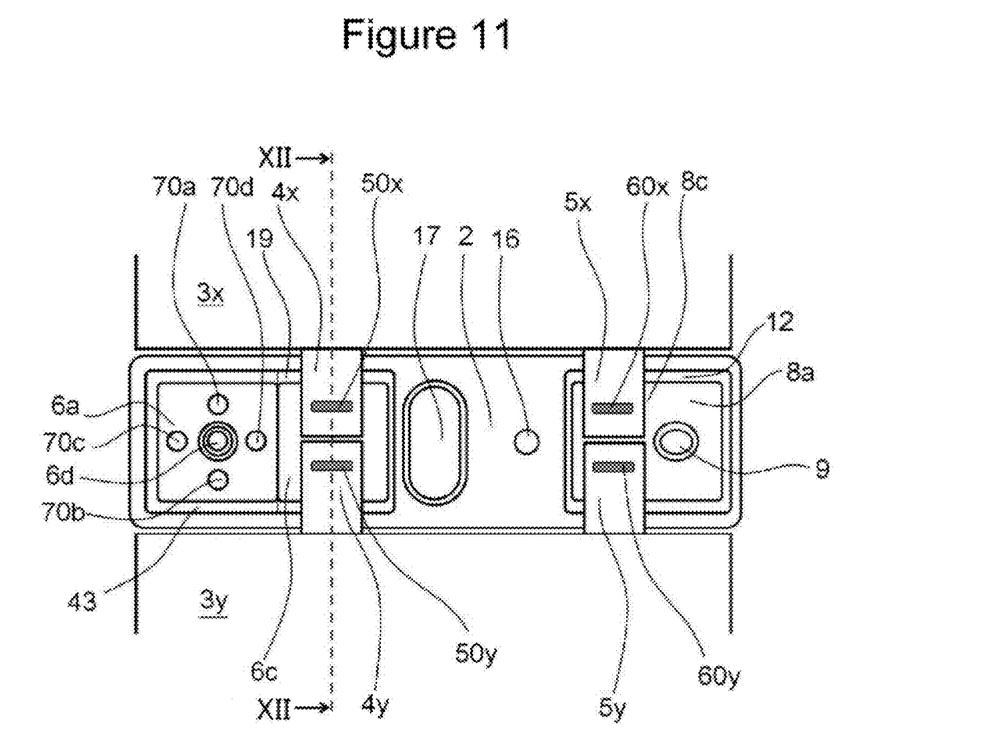
FIG. 11 is a diagram of a battery internal surface side of a sealing plate to which the collectors have been attached.

As illustrated in FIGS. 9 to 11, the positive electrode collector 6 includes the collector body portion 6a, the lead portion 6c, and a collector connection 6b that connects the collector body portion 6a and the lead portion 6c to each other.

A through-hole 6d for connection is formed in the collector body portion 6a, and a thin wall portion 6e is formed around the through-hole 6d for connection. Furthermore, an annular groove portion 6f is provided inside the thin wall portion 6e so as to surround the through-hole 6d for connection. A thickness (a residual thickness) of the groove portion 6f is smaller than that of the thin wall portion 6e. Note that the annual groove portion 6f is a fragile portion and is broken upon deformation of the deformation plate 42. In other words, the fragile portion is the portion to be broken. Note that since it is only sufficient that the conductive path is cut off upon breakage of the fragile portion, both of the thin wall portion 6e and the groove portion 6f do not have to be provided. Only the thin wall portion 6e or only the groove portion 6f may be provided. Alternatively, the connection between the deformation plate 42 and the collector body portion 6a may be a fragile portion without providing the thin wall portion 6e or the groove portion 6f. Alternatively, the fragile portion, such as the thin wall portion or a groove portion, may be provided in the deformation plate 42. Note that the through-hole 6d for connection is not an essential configuration, and the thin wall portion provided in the collector body portion 6a may be connected to the deformation plate 42.

A first through-hole 6y1 for fixing, a second through-hole 6y2 for fixing, a third through-hole 6y3 for fixing, and a fourth through-hole 6y4 for fixing are provided in the collector body portion 6a. A recess is provided around each of the first through-hole 6y1 for fixing, the second through-hole 6y2 for fixing, the third through-hole 6y3 for fixing, and the fourth through-hole 6y4 for fixing.

[Attaching Positive Electrode Collector]

The positive electrode collector 6 described above is disposed on the surface of the dielectric plate 43 on the electrode body 3 side. In so doing, the first projection 43d1, the second projection 43d2, the third projection 43d3, and the fourth projection 43d4 formed in the dielectric plate 43 are respectively inserted into the first through-hole 6y1 for fixing, the second through-hole 6y2 for fixing, the third through-hole 6y3 for fixing, and the fourth through-hole 6y4 for fixing formed in the positive electrode collector 6. Subsequently, by expanding the diameters of the tips of the first projection 43d1, the second projection 43d2, the third projection 43d3, and the fourth projection 43d4, the positive electrode collector 6 is fixed to the dielectric plate 43. With the above, a first fixed portion 70a, a second fixed portion 70b, a third fixed portion 70c, and a fourth fixed portion 70d are formed.

Gas is sent in through the terminal through-hole 7x formed in the positive electrode terminal 7 from the battery outer portion side, so that the deformation plate 42 is urged against the collector body portion 6a of the positive electrode collector 6. In the above state, the edge portion of the through-hole 6d for connection provided in the collector body portion 6a of the positive electrode collector 6 and the deformation plate 42 are joined together by laser welding or the like. Note that the through-hole 6d for connection is not an essential configuration and a collector body portion 6a that has no through-hole 6d for connection may be joined to the deformation plate 42. The terminal through-hole 7x is sealed with the terminal plug 7y.

As illustrated in FIGS. 9 to 11, the collector body portion 6a of the positive electrode collector 6 is disposed on the surface of the dielectric plate 43 on the battery inner portion side. The collector connection 6b that extend towards the sealing plate 2 side from the collector body portion 6a is provided at an end portion of the collector body portion 6a. Furthermore, the lead portion 6c is provided so as to extend along the sealing plate 2 from an end portion of the collector connection 6b on the sealing plate 2 side towards the gas discharge valve 17 side. The lead portion 6c is disposed parallel to the sealing plate 2. The lead portion 6c is disposed on the sealing plate 2 with a lead portion insulating member 19 (a positive electrode insulating member) in between. Note that the lead portion insulating member 19 may be formed together with the inner side insulating member 10 or the dielectric plate 43 in an integrated manner.

<Attaching Negative Electrode Terminal to Sealing Plate>

A through hole serving as a negative electrode terminal mounting, hole 2b is formed in the sealing plate 2. The outer side insulating member 13 is disposed on the outer surface side of the negative electrode terminal mounting hole 2h, and the inner side insulating member 12 and a collector body portion 8a of the negative electrode collector 8 are disposed on the inner surface side. A through-hole is provided in the collector body portion 8a. Furthermore, the negative electrode terminal 9 is inserted from the battery outer portion side through the through-holes formed in the outer side insulating member 13, the sealing plate 2, the inner side insulating member 12, and collector body portion 8a of the negative electrode collector 8, and the tip of the negative electrode terminal 9 is riveted on the negative electrode collector 8. Furthermore, the riveted portion of the negative electrode terminal 9 is welded to the negative electrode collector 8.

<Connecting Tab Portions and Collectors to Each Other>

Figure 12:
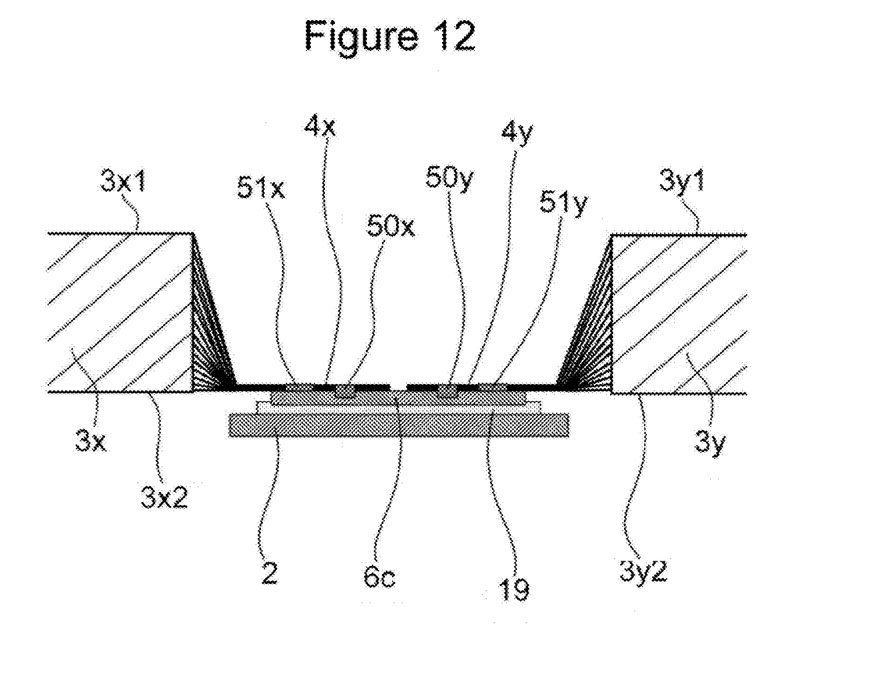
FIG. 12 is a cross-sectional view taken along line XII-XII in FIG. 11.

As illustrated in FIGS. 11 and 12, a first electrode body element 3x is disposed on a first side of the sealing plate 2 in a short direction (an up-down direction in FIG. 11, and a left-right direction in FIG. 12), and a second electrode body element 3y is disposed on a second-side. Subsequently, a first positive electrode tab group 4x of the first electrode body element 3x is disposed on the lead portion 6c of the positive electrode collector 6, and a first negative electrode tab group 5x of the first electrode body element 3x is disposed on the lead portion 8c of the negative electrode collector 8. Furthermore, a second positive electrode tab group 4y of the second electrode body element 3y is disposed on the Lead portion 6c of the positive electrode collector 6, and a second negative electrode tab group 5y of the second electrode body element 3y is disposed on the lead portion 8c of the negative electrode collector 8. In so doing, in the first electrode body element 3x, the positive electrode tabs 4c constituting the first positive electrode tab group 4x are bundled on an undersurface 3x2 side of the first electrode body element 3x Furthermore, the negative electrode tabs 5c constituting the first negative electrode tab group 5x are bundled on the undersurface 3x2 side of the first electrode body element 3x In a similar manner, in the second electrode body element 3y the positive electrode tabs 4c that constitute the second positive electrode tab group 4y are bundled on an undersurface 3y2 side of the second electrode body element 3y, and the negative electrode tabs 5c that constitute the second negative electrode tab group 5y are bundled on the undersurface 3y2 side of the second electrode body element 3y.

Subsequently, a high energy ray such as a laser beam is projected from above to the first positive electrode tab group 4x and the second positive electrode tab group 4y disposed on the lead portion 6c of the positive electrode collector 6 to weld the first positive electrode tab group 4x and the second positive electrode tab group 4y to the lead portion 6c. Furthermore, a high energy ray such as a laser beam is projected from above to the first negative electrode tab group 5*x* and the second negative electrode tab group 5*y* disposed on the lead portion 8*c* of the negative electrode collector 8 to weld the first negative electrode tab group 5*x* and the second negative electrode tab group 5*y* to the lead portion 8*c*. With the above, welded portions 50*x*, 50*y*, 60*x*, and 60*y* are formed.

Note that in each of the first electrode body element 3*x* and the second electrode body element 3*y*, the positive electrode tabs 4*c* may be joined to each other in advance by welding or the like and preliminary joint portions 51*x* and 51*y* may be formed before connecting the tab portions and the collectors to each other. Furthermore, in a similar manner, preliminary joint portions may be formed on the negative electrode side as well by joining the negative electrode tabs 5*c* to each ether in advance. Furthermore, a positive electrode auxiliary conductive member and a negative electrode auxiliary conductive member may be connected to the positive electrode tab groups (4*x* and 4*y*) and the negative electrode tab groups (5*x* and 5*y*), respectively, in advance. Furthermore, the positive electrode auxiliary conductive member and the negative electrode auxiliary conductive member that are joined to the positive electrode tab groups (4*x* and 4*y*) and the negative electrode tab groups (5*x* and 5*y*), respectively, may be connected to the positive electrode collector and the negative electrode collector, respectively, fixed to the sealing plate 2.

<Fabrication of Electrode Body>

The first positive electrode tab group 4*x*, the second positive electrode tab group 4*y*, the first negative electrode tab group 5*x*, and the second negative electrode tab group 5*y* are bent so that the upper surface 3*x*1 of the first electrode body element 3*x* and the upper surface 3*y*1 of the second electrode body element 3*y* illustrated in FIG. 12 come into contact with each other. With the above, the first electrode body element 3*x* and the second electrode body element 3*y* are arranged into a single piece, so as to become a single electrode body 3 illustrated in FIGS. 3 to 6.

<Assembling Square Secondary Battery<

The electrode body 3 attached to the sealing plate 2 is covered with the insulation sheet 14 and is inserted into the square outer package 1. Subsequently, the sealing plate 2 and the square outer package 1 are joined to each other by laser welding or the like to seal the opening of the square outer package 1. After the above, nonaqueous electrolyte containing an electrolyte solvent and electrolyte salt is injected through the electrolyte injection hole 15 provided in the sealing plate 2. Subsequently, the electrolyte injection hole 15 is sealed with the sealing plug 16.

<Square Secondary Battery 20>

In the square secondary battery 20, the positive electrode tabs 4*c* and the negative electrode tabs 5*c* are disposed on the sealing plate 2 side in the electrode body 3. In other words, the positive electrode tabs 4*c* and the negative electrode tabs 5*c* are disposed between a power generation portion in the electrode body 3 in which the positive electrode plates 4 and the negative electrode plates 5 are stacked with the separators in between and the sealing plate 2. Furthermore, the positive electrode tabs 4*c* and the negative electrode tabs 5*c* are connected to the positive electrode collector and the negative electrode collector, respectively, in a curved state. Accordingly, the space occupied by the portion not involved in generating power can be made small and the secondary battery becomes one with a higher volume energy density.

Furthermore, by having the positive electrode tabs 4*c* and the negative electrode tabs 5*c* be in a curved state, the positive electrode tabs 4*c* or the negative electrode tabs 5*c* can be prevented from becoming damaged or broken even when there is a strong impact or a vibration applied to the square secondary battery 20.

Furthermore, the cutaways 4*e* are, in the positive electrode plates 4, provided at the base portions of the positive electrode tabs 4*c*. Accordingly, distortion in the positive electrode plate 4 in a portion near the base of the positive electrode tab 4*c* or a creation of a gap between the positive electrode plate 4 in the portion near the base of the positive electrode tab 4*c* and the separator can be prevented even when the positive electrode tab 4*c* is in a curved state. Accordingly, damage in the positive electrode active material mixture layer or not being able to perform a smooth charge and discharge reaction can be prevented.

The cutaways 4*e* are provided in the positive electrode core body at positions where the positive electrode active material mixture layer 4*a* is formed. Accordingly, the positive electrode active material mixture layer 4*a* is disposed on the positive electrode core body at edges of the cutaways 4*e*. Accordingly, since the positive electrode core body is reinforced by the positive electrode active material mixture layer 4*a*, tearing of the positive electrode plate 4 originating from the cutaways 4*e* can be prevented.

In the square secondary battery 28, the first positive electrode tab group 4*x* of the first electrode body element 3*x* and the first negative electrode tab group 5*x*, and the second positive electrode tab group 4*y* of the second electrode body element 3*y* and the second negative electrode tab group 5*y* are configured to curve in different directions. With the above, the secondary battery can be facilitated to be one with a higher volume energy density. Furthermore, bending or the like of the positive electrode plates 4 near the bases of the positive electrode tabs 4*c* can be prevented in a more effective manner when compared to a configuration in which the positive electrode tab groups and the negative electrode tab groups in a single electrode body are curved in the same direction. Such a configuration is especially effective when the thickness of the electrode body 3 is 20 mm or more. Note that the thickness of the electrode body 3 is preferably 50 mm or less.

The surface of the positive electrode active material mixture layer 4*a* of the positive electrode plate 4 and the separator are, desirably, adhered to each other. With the above, loads are applied to circumferences of the cutaways 4*e*, and tearing of the positive electrode plates 4 can be suppressed in a further effective manner. Note that, desirably, the positive electrode plates 4 are adhered to the separators before the step in which the positive electrode tab 4*c* is curved. With the above, since distortions and the like do not easily occur in the positive electrode plates 4 in the areas where the positive electrode active material mixture layers 4*a* are formed and in the portions near the base of the positive electrode tab 4*c* and, further, since the positive electrode plates are reinforced, tearing or the like originating from the cutaways can be prevented from occurring. Misalignment of the positive electrode plates 4 can be prevented when the positive electrode tabs 4*c* are connected to the positive electrode collector 6.

In the positive electrode plate 4, desirably, the circumferences of the cutaways 4*e* are adhered to the separator. Since the circumferences of the cutaways 4*e* can be reinforced with the separators, tearing or the like in the positive electrode plates 4 originating from the cutaways 4*e* can be reliably prevented from occurring.

The surface of the negative electrode active material mixture layer 5*a* of the negative electrode plate 5 and the separator are, desirably, adhered to each other.

Desirably, the protective layer 4d that is electrically insulating or that has an electric resistance that is larger than those of the positive electrode core body and the positive electrode active material mixture layer is formed on the positive electrode tab 4c, the positive electrode active material mixture layer 4a is formed in a portion of the edge of the cutaway 4e, and the protective layer 4d is formed in a portion of the edge of the cutaway 4e.

In the example described above, an example has been described in which the sealing plate is disposed, among the six main surfaces of the rectangular-shaped battery case, at the surface with the smallest area; however, the sealing plate can be disposed at other surfaces. However, as in the example described above, when the sealing plate is disposed at the surface with the smallest area, the secondary battery becomes one with a higher energy density.

As is the case of the square secondary battery 20, desirably, the current breaking mechanism that is activated when the internal pressure of the battery becomes equivalent to or higher than a predetermined value is included. In such a case, desirably, the positive electrode active material mixture layer contains lithium carbonate. With the above, when the square secondary battery 20 is in an overcharged state, the lithium carbonate becomes decomposed and gas is generated; accordingly, the current breaking mechanism can be activated in a short time. In such a case, the cutaways 4e provided in the positive electrode plates 4 serve as passages through which the gas generated inside the positive electrode active material mixture layer 4a passes to the sealing plate 2 side. Accordingly, the current breaking mechanism can be activated in a further smooth manner, which is more desirable.

Figure 13:
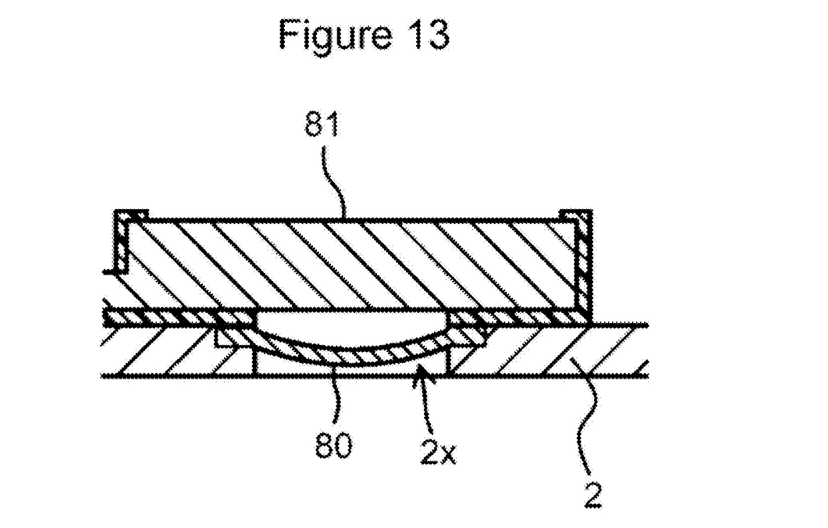
FIG. 13 is a cross-sectional view of a short-circuiting mechanism.

Note that in place of the current breaking mechanism described in the example described above, a short-circuiting mechanism that is activated when the internal pressure of the battery becomes equivalent to or higher than a predetermined value may be provided. As illustrated in FIG. 13, for example, regarding the short-circuiting mechanism, the sealing plate 2 is provided with a deforming portion 80 that deforms when the internal pressure of the battery becomes equivalent to or higher than a predetermined value, and a negative-electrode external-portion conductive member 81 electrically connected to the negative electrode plates is disposed on the outer side of the deforming portion 80. The deforming portion 80 is then electrically connected to the positive electrode plates so that the deforming portion 80 and the negative-electrode external-portion conductive member 81 are electrically connected to each other when the deforming portion 80 becomes deformed. Kith the above, when the short-circuiting mechanism is activated, the positive electrode plates and the negative electrode plates are electrically connected to each other. In a case in which the secondary battery includes the short-circuiting mechanism, it is desirable that fuse portions be provided in the positive electrode collector, the negative electrode collector, and the like. Furthermore, the fuse portions may be provided in a positive-electrode external-portion conductive member that is connected to the battery outer portion side of the positive electrode terminal and the positive electrode terminal. Furthermore, desirably, the fuse portions are thermally cut by the short circuit current that Slows when the short-circuiting mechanism is activated. Note that the deforming portion 80 is, desirably, an inverted plate disposed so as to close a sealing plate through-hole 2x provided in the sealing plate 2. In a case as well in which the secondary battery includes the short-circuiting mechanism, desirably, the positive electrode active material mixture layer contains lithium carbonate.

As a configuration of the short-circuiting mechanism, the sealing plate may have two deforming portions, the positive-electrode external-portion conductive member electrically connected to the positive electrode plates may be disposed above one of the deforming portions, and the negative-electrode external-portion conductive member electrically connected to the negative electrode plates may be disposed above the other deforming portion. In such a configuration, at ordinary times, the sealing plate and the two deforming portions are not electrically connected to either of the positive electrode plates and the negative electrode plates. When the internal pressure of the battery rises, the two deforming portions become deformed and, accordingly, the positive electrode plates and the negative electrode plates become electrically connected to each other through the positive-electrode external-portion conductive member, the one of the deforming portions, the sealing plate, the other one of the deforming portions, and the negative-elect rode external-portion conductive member.

An amount of lithium carbonate contained in the positive electrode active material mixture layer is preferably 0.1 to 5 mass % with respect to the positive electrode active material, and more preferably is 0.5 to 3 mass %. Furthermore, desirably, lithium phosphate is further contained in the positive electrode active material mixture layer.

The method of connecting the positive electrode tabs and the positive electrode collector to each other, and the method of connecting the negative electrode tabs and the negative electrode collector are not limited in particular, and, for example, resistance welding, welding through projection of, for example, a high energy ray such as laser ultrasonic welding, or ultrasonic welding may be used.

The electrode body element is not limited to a stacked type. A belt-shaped positive electrode plate and a belt-shaped negative electrode plate with a belt-shaped separator in between may be wound as the electrode body element.

REFERENCE SIGNS LIST 1 square outer package
1a bottom
1b large-area side wall
1c small-area side wall
2 sealing plate
2a positive electrode terminal mounting hole
2b negative electrode terminal mounting hole
3 electrode body
3x first electrode body element
3y second electrode body element
4 positive electrode plate
4a positive active material mixture layer
4b positive electrode core body exposed portion
4c positive electrode tab
4d protective layer
4e cutaway
4f body portion
4x first positive electrode tab group
4y second positive electrode tab group
5 negative electrode plate
5a negative electrode active material mixture layer
5b negative electrode core body exposed portion
5c negative electrode tab
5f body portion
5x first negative electrode tab group
5y second negative electrode tab group
6 positive electrode collector
6a collector body portion 6b collector connection
6c lead portion
6d through-hole for connection
6e thin wall portion
6f groove portion
6y1 first through-hole for fixing
6y2 second through-hole for fixing
6y3 third through-hole for fixing
6y4 fourth through-hole for fixing
7 positive electrode terminal
7x terminal through-hole
7y terminal plug
8 negative electrode collector
8a collector body portion
8c lead portion
9 negative electrode terminal
10, 12 inner side insulating member
10a insulating member body portion
10b insulating member first side wall
10c insulating member second side wall
10d protrusion
11, 13 outer side insulating member
14 insulation sheet
15 electrolyte injection hole
16 sealing plug
17 gas discharge valve
18 tape
19 lead portion insulating member
20 square secondary battery
40 current breaking mechanism
41 conductive member
41a base portion
41b tubular portion
41c flange portion
42 deformation plate
42a projection
43 dielectric plate
43a dielectric plate body portion
43b dielectric plate first side wall
43c dielectric plate through-hole
43d1 first projection
43d2 second projection
43d3 third projection
43d4 fourth projection
50x, 50y welded portion
51x, 51y preliminary joint portion
60x, 60y welded portion
70a first fixed portion
70b second fixed portion
70c third fixed portion
70d fourth fixed portion
80 deforming portion
81 negative-electrode external-portion conductive member

The invention claimed is:

1. A method of manufacturing a secondary battery including an electrode body having a positive electrode plate having a positive electrode tab, a negative electrode plate having a negative electrode tab, and a separator disposed between the positive electrode plate and the negative electrode plate, a positive electrode collector electrically connected to the positive electrode plate, a negative electrode collector electrically connected to the negative electrode plate, an outer package that includes an opening and that houses the electrode body, and a sealing plate that seals the opening, wherein the positive electrode tab and the negative electrode tab are disposed on a sealing plate side of the electrode body, the positive electrode plate includes a positive electrode core body and a positive electrode active material mixture layer formed on the positive electrode core body, the positive electrode plate having a body portion in which the positive electrode active material mixture layer is formed on the positive electrode core body, the positive electrode tab protrudes from an end portion of the body portion, a cutaway is, in the body portion of the positive electrode plate, provided at a base of the positive electrode tab, and the positive electrode tab and the negative electrode tab are in a curved state, the method of manufacturing a secondary battery comprising:

a cutting away step of providing, in the positive electrode core body, the cutaway at the base of the positive electrode tab in the body portion of the positive electrode plate in which the positive electrode active material mixture layer is formed;

an electrode body fabricating step of fabricating the electrode body using the positive electrode plate and the negative electrode plate; and a connecting step of connecting the positive electrode tab to the positive electrode collector, the method further comprising the steps of:

disposing the positive electrode tab and the negative electrode tab on the sealing plate side of the electrode body, wherein the positive electrode tab and the negative electrode tab protrude directly from an end of the electrode body on the sealing plate side; and forming the positive electrode tab of a part of the positive electrode core body which extends from an end portion of the body portion, such that the positive electrode tab protrudes from the end portion of the body portion.

2. The method of manufacturing a secondary battery according to claim 1, wherein
an area of a region in the positive electrode plate where the positive electrode active material mixture layer is formed is smaller than an area of a region in the negative electrode plate where the negative electrode active material mixture layer is formed.

3. The method of manufacturing a secondary battery according to claim 1, further comprising,
an adhering step of adhering the separator and the positive electrode plate to each other by providing an adhesion layer therebetween before the connecting step.

4. The method of manufacturing a secondary battery according to claim 1, further comprising,
an adhering step of adhering the separator and the negative electrode plate to each other by providing an adhesion layer therebetween before the connecting step.

5. The method of manufacturing a secondary battery according to claim 1, wherein
a circumference of the cutaway in the positive electrode plate is adhered to the separator via an adhesion layer.

6. The method of manufacturing a secondary battery according to claim 1, wherein
in the electrode body fabrication step, a first electrode body element including the positive electrode plate, the negative electrode plate, and the separator is fabricated, and a second electrode body element including the positive electrode plate, the negative electrode plate, and the separator is fabricated,
in the connecting step, the positive electrode tab of the positive electrode plate included in the first electrode body element and the positive electrode tab of the positive electrode plate included in the second electrode body element are electrically connected to the positive electrode collector, and after the connecting step, the first electrode body element and the second electrode body element are arranged into a single piece to form the electrode body.

7. The method of manufacturing a secondary battery according to claim 6, wherein a thickness of the electrode body is 20 mm or more.

8. A secondary battery comprising:

an electrode body having a positive electrode plate having a positive electrode tab, a negative electrode plate having a negative electrode tab, and a separator disposed between the positive electrode plate and the negative electrode plate;

a positive electrode collector electrically connected to the positive electrode plate;

a negative electrode collector electrically connected to the negative electrode plate;

an outer package that includes an opening and that houses the electrode body; and a sealing plate that seals the opening, wherein the positive electrode tab and the negative electrode tab are disposed on a sealing plate side of the electrode body, the positive electrode tab and the negative electrode tab protrude directly from an end of the electrode body on the sealing plate side, the positive electrode plate includes a positive electrode core body and a positive electrode active material mixture layer formed on the positive electrode core body, the positive electrode plate having a body portion in which the positive electrode active material mixture layer is formed on the positive electrode core body, the positive electrode tab protrudes from an end portion of the body portion, the positive electrode tab is formed of a part of the positive electrode core body which extends from the end portion of the body portion, a cutaway is, in the body portion of the positive electrode plate, provided at a base of the positive electrode tab, and the positive electrode tab and the negative electrode tab are in a curved state.

9. The secondary battery according to claim 8, wherein an area of a region in the positive electrode plate where the positive electrode active material mixture layer is formed is smaller than an area of a region in the negative electrode plate where the negative electrode active material mixture layer is formed.

10. The secondary battery according to claim 8, wherein the separator and the positive electrode plate are adhered to each other via an adhesion layer.

11. The secondary battery according to claim 8, wherein the separator and the negative electrode plate are adhered to each other via an adhesion layer.

12. The secondary battery according to claim 8, wherein a circumference of the cutaway in the positive electrode plate is adhered to the separator via an adhesion layer.

13. The secondary battery according to claim 8, wherein the electrode body comprises: a first electrode body element including the positive electrode plate, the negative electrode plate and the separator; and a second electrode body element including a second positive electrode plate, a second negative electrode plate and a second separator, a first positive electrode tab group of the first electrode body element and a second positive electrode tab group of the second electrode body element are configured to curve in different directions from each other, and a first negative electrode tab group of the first electrode body element and a second negative electrode tab group of the second electrode body element are configured to curve in different directions from each other.

14. The secondary battery according to claim 13, wherein a thickness of the electrode body is 20 mm or more.

* * * * *